United States Patent
Nagai et al.

(10) Patent No.: US 9,644,672 B2
(45) Date of Patent: May 9, 2017

(54) TAPERED ROLLER BEARING

(71) Applicant: JTEKT CORPORATION, Osaka-shi, Osaka (JP)

(72) Inventors: Atsushi Nagai, Kashiwara (JP); Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/075,939

(22) Filed: Mar. 21, 2016

(65) Prior Publication Data

US 2016/0281775 A1 Sep. 29, 2016

(30) Foreign Application Priority Data

Mar. 23, 2015 (JP) ................. 2015-059741

(51) Int. Cl.
*F16C 19/36* (2006.01)
*F16C 33/66* (2006.01)
*F16C 19/54* (2006.01)

(52) U.S. Cl.
CPC ........ *F16C 19/364* (2013.01); *F16C 33/6651* (2013.01); *F16C 33/6681* (2013.01); *F16C 19/548* (2013.01); *F16C 2361/61* (2013.01)

(58) Field of Classification Search
CPC . F16C 33/6655; F16C 33/6651; F16C 33/664
See application file for complete search history.

(56) References Cited

U.S. PATENT DOCUMENTS

| 7,645,074 B2* | 1/2010 | Chiba | F16C 19/364 384/571 |
| 7,950,856 B2* | 5/2011 | Sada | F16C 19/364 384/473 |
| 8,858,086 B2* | 10/2014 | Murata | F16C 33/6681 384/462 |
| 2007/0133914 A1* | 6/2007 | Matsuyama | F16C 19/163 384/470 |
| 2008/0096715 A1* | 4/2008 | Ono | F16C 19/548 475/160 |
| 2009/0208152 A1* | 8/2009 | Masuda | F16C 19/364 384/100 |
| 2013/0077905 A1 | 3/2013 | Shimizu et al. | |

(Continued)

FOREIGN PATENT DOCUMENTS

JP 2008-057791 A 3/2008
JP 2011-256895 A 12/2011

*Primary Examiner* — Thomas R. Hannon
(74) *Attorney, Agent, or Firm* — Oliff PLC

(57) ABSTRACT

A tapered roller bearing includes an outer ring having an outer-ring raceway surface that increases in diameter from a first side toward a second side in an axial direction, an inner ring having an inner-ring raceway surface and also having a cone back face rib that is located on the second side of the inner ring in the axial direction and that protrudes outward in a radial direction, a plurality of tapered rollers, an annular cage, and a reservoir portion provided on the second side of the outer ring in the axial direction and having a recessed groove that is formed on an inner periphery of the reservoir portion and in which lubricant is stored. The recessed groove has a recess and protrusion at its bottom.

3 Claims, 5 Drawing Sheets

(56) References Cited

U.S. PATENT DOCUMENTS

2015/0063735 A1* 3/2015 Murata ............... F16C 33/6651
  384/470
2015/0247532 A1* 9/2015 Suzuki ................ F16C 33/6674
  384/462

* cited by examiner

TAPERED ROLLER BEARING

INCORPORATION BY REFERENCE

The disclosure of Japanese Patent Application No. 2015-059741 filed on Mar. 23, 2015 including the specification, drawings and abstract, is incorporated herein by reference in its entirety.

BACKGROUND OF THE INVENTION

1. Field of the Invention

The invention relates to a tapered roller bearing.

2. Description of the Related Art

Tapered roller bearings can receive a radial load and an axial load in one direction and are used in various fields. For example, a tapered roller bearing is used to support a shaft provided in a gear mechanism for a transmission, a differential apparatus, and the like in an automobile. Such a tapered roller bearing includes an outer ring, an inner ring, a plurality of tapered rollers, and an annular cage. The outer ring has an outer-ring raceway surface that increases in diameter from a first side toward a second side in an axial direction. The inner ring has an inner-ring raceway surface facing the outer-ring raceway surface and has a cone back face rib (large rib) on the second side of the inner-ring raceway surface in the axial direction. The tapered rollers are interposed between the outer-ring raceway surface and the inner-ring raceway surface. The cage holds the tapered rollers spaced at intervals in a circumferential direction.

For example, in the differential apparatus, a bottom portion of a housing of the apparatus serves as a lubricant reservoir (oil reservoir). A rotating ring gear scoops up and splatters a lubricant stored in the lubricant reservoir to allow the lubricant to be used to lubricate the tapered roller bearing. However, in an initial stage of rotation such as starting of an engine, feeding of oil to the tapered roller bearing based on the scooping up of the lubricant as described above is insufficient. Thus, the tapered roller bearing may be in a poor lubrication state. In the tapered roller bearing, large end faces of the tapered rollers come into sliding contact with the large rib of the inner ring. Consequently, when these sliding contact portions are in the poor lubrication state, temperature may be elevated due to sliding friction, leading to seizure.

Thus, a tapered roller bearing has been proposed in which a ring member (partition plate) with an L-shaped section is attached to a part of the outer ring that corresponds to an outer position of the large rib of the inner ring in a radial direction, that is, to an end of the outer ring (see FIG. 5 and FIG. 6 in Japanese Patent Application Publication No. 2008-57791 (JP 2008-57791 A)). The ring member allows the lubricant to be stored in the tapered roller bearing. Consequently, in the initial stage of rotation, the lubricant can be utilized for lubrication between the large rib of the inner ring and end surfaces of the tapered roller bearings.

The tapered roller bearing described in JP 2008-57791 A, the lubricant stored in the ring member with the L-shaped section allows enhancement of the resistance to seizure between the large rib and the tapered rollers. However, the lubricant contains foreign matter such as wear debris, and thus, such foreign matter is stored in the tapered roller bearing by the ring member with the L-shaped section. When the foreign matter reaches between the large rib and the tapered rollers or a bearing interior where the raceway surfaces for the tapered rollers and the like are located, the life of the bearing is shortened.

SUMMARY OF THE INVENTION

An object of the invention is to provide a tapered roller bearing that allows lubricant to be stored and that, even when the lubricant contains foreign matter, hinders the foreign matter from entering the bearing interior.

In an aspect of the invention, a tapered roller bearing includes an outer ring having an outer-ring raceway surface that increases in diameter from a first side toward a second side in an axial direction, an inner ring having an inner-ring raceway surface facing the outer-ring raceway surface and having a cone back face rib that is located on the second side of the inner ring in the axial direction and that protrudes outward in a radial direction, a plurality of tapered rollers interposed between the outer-ring raceway surface and the inner-ring raceway surface and contacting the cone back face rib, an annular cage that holds the tapered rollers spaced at intervals in a circumferential direction, and a reservoir portion that is provided on the second side of the outer ring in the axial direction and having a recessed groove that is formed on an inner periphery of the reservoir portion and in which lubricant is stored. The recessed groove has a recess and protrusion at its bottom.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
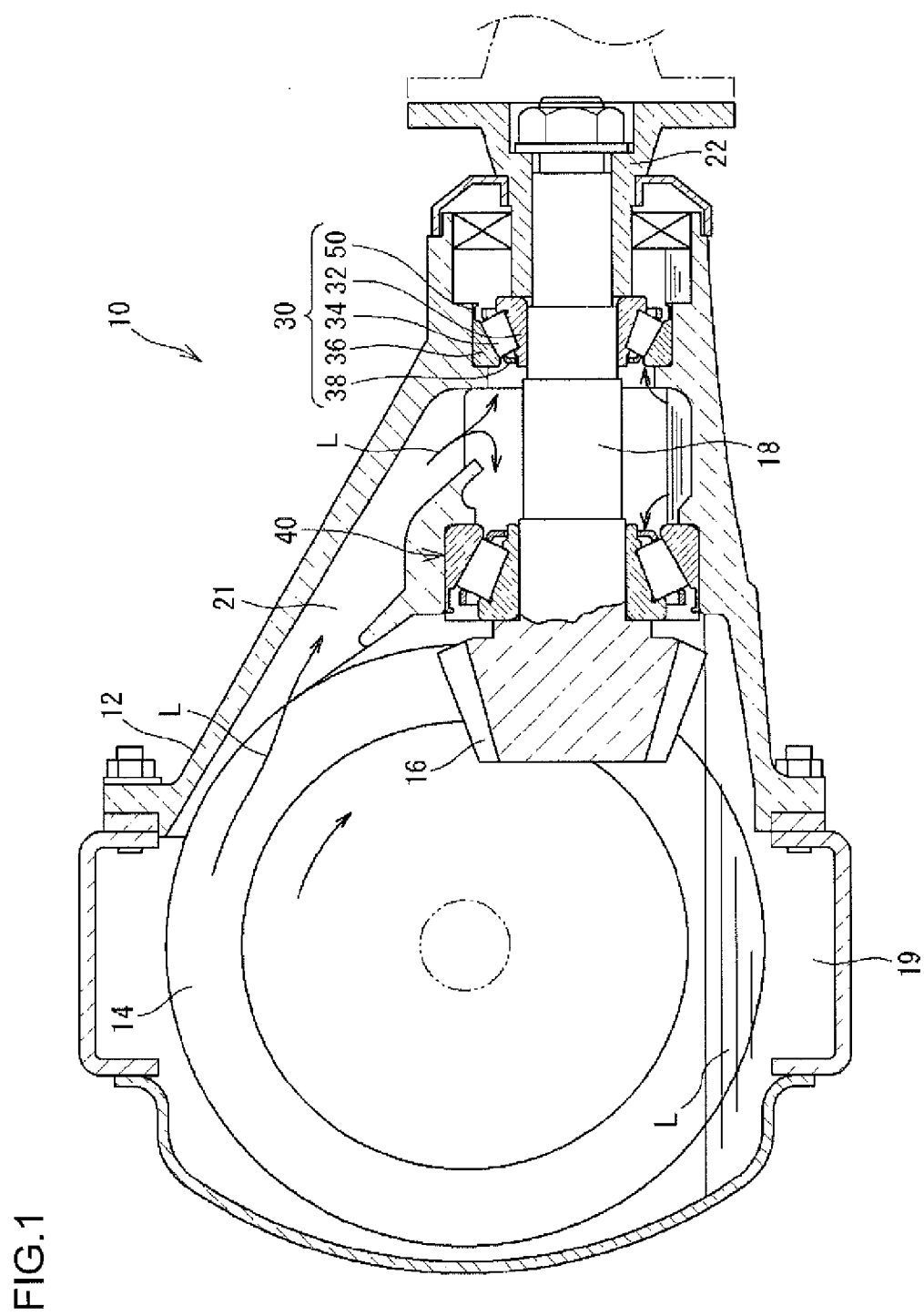
FIG. 1 is a longitudinal sectional view depicting an embodiment of a rotating apparatus including a tapered roller bearing according to the invention.

Embodiments of the invention will be described below based on the drawings. FIG. 1 is a longitudinal sectional view depicting an embodiment of a rotating apparatus including a tapered roller bearing according to the invention. In a description of the present embodiment, the tapered roller bearing is applied to a differential apparatus 10 in an automobile. However, the tapered roller bearing can be applied to various rotating apparatuses.

In the differential apparatus 10, a ring gear 14 and a drive pinion 16 are arranged in a housing 12 so as to mesh with each other. The drive pinion 16 is integrally formed at a first end (in FIG. 1, a left end) of a shaft 18. A sleeve 22 is attached to a second end (in FIG. 1, a right end) of the shaft 18. The sleeve 22 is coupled to an engine via a joint and a propeller shaft not depicted in the drawings. A driving force of the engine is transmitted to the drive pinion 16. The ring gear 14 is equipped with a differential mechanism not depicted in the drawings. The differential mechanism transmits mechanical power to right and left wheels.

The shaft 18 is rotatably supported in the housing 12 by a front bearing 30 and a rear bearing 40. The front bearing 30 and the rear bearing 40 are both tapered roller bearings. The front bearing 30 and the rear bearing 40 are different in bearing number (in size) but have the same configuration. Thus, a detailed configuration of the tapered roller bearing according to the invention will be described taking the front bearing 30 as an example.

Figure 2:
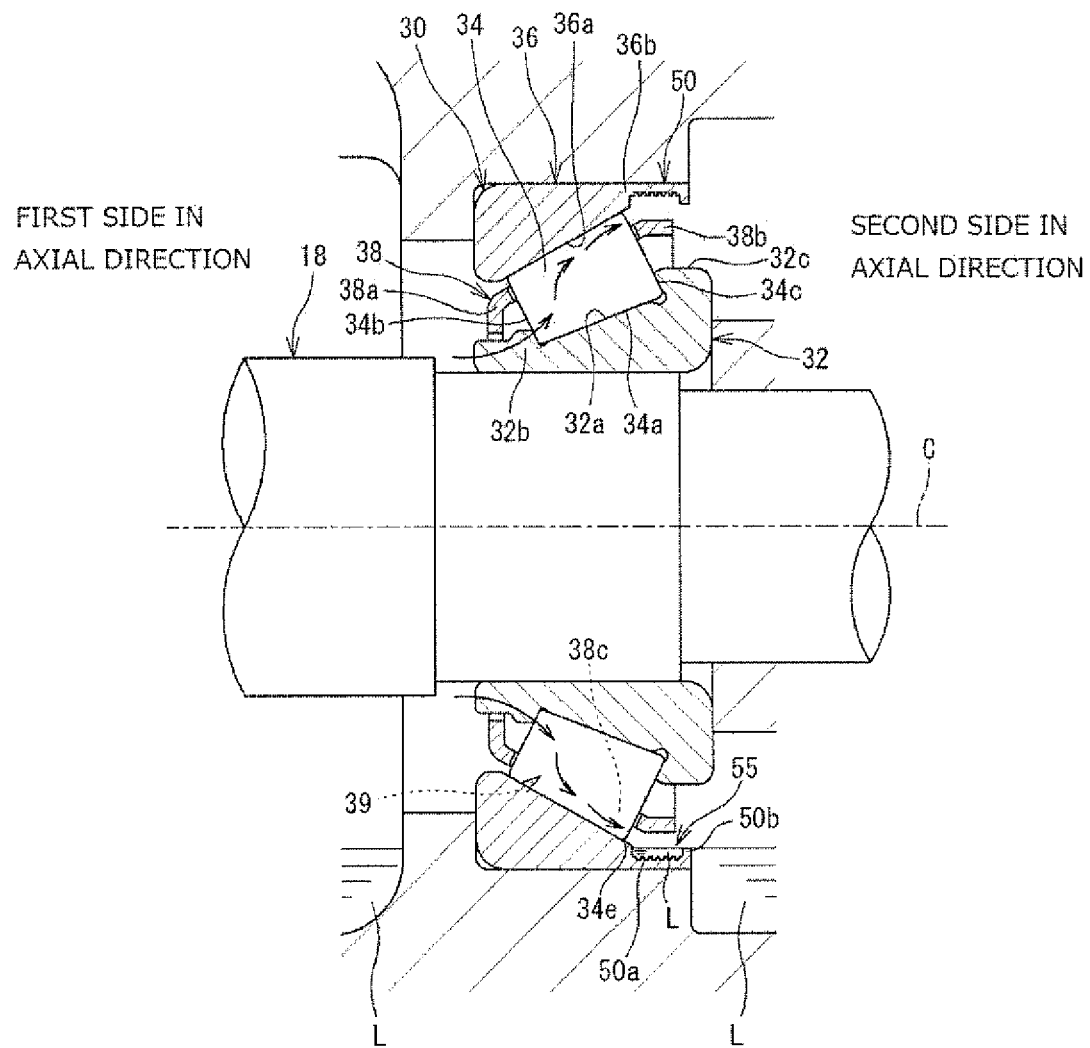
FIG. 2 is a longitudinal sectional view depicting a front bearing and a periphery thereof.

FIG. 2 is a longitudinal sectional view of the front bearing 30 and a periphery thereof. The front bearing 30 includes an outer ring 36, an inner ring 32, tapered rollers 34, and a cage 38. The front bearing 30 in the present embodiment further has a reservoir portion 50 in which lubricant is stored. The reservoir portion 50 is integrated with the outer ring 36. In other words, the reservoir portion 50 is provided in a part of the outer ring 36.

The outer ring 36 has an outer-ring raceway surface 36a shaped like a conical surface and increasing in diameter from a first side (in FIG. 2, a left side) toward a second side (in FIG. 2, a right side) in the axial direction. The inner ring 32 has an inner-ring raceway surface 32a shaped like a conical surface and facing the outer-ring raceway surface 36a. The inner ring 32 has a cone front face rib (small rib) 32b with a small diameter and a large rib 32c with a large diameter. The small rib 32b is located on the first side of the inner-ring raceway surface 32a in the axial direction and protrudes outward in a radial direction. The large rib 32c is located on the second side of the inner-ring raceway surface 32a in the axial direction and protrudes outward in the radial direction.

Each of the tapered rollers 34 has an outer peripheral surface 34a shaped like a truncated cone. The tapered roller 34 has a small end face 34b on the first side of the tapered roller 34 in the axial direction and a large end face 34c on the second side of the tapered roller 34 in the axial direction. A plurality of the tapered rollers 34 is interposed between the outer-ring raceway surface 36a and the inner-ring raceway surface 32a. The inner ring 32 rotates to roll the tapered rollers 34 on the inner-ring raceway surface 32a and the outer-ring raceway surface 36a.

The cage 38 is an annular member having a small-diameter annular portion 38a on the first side of the cage 38 in the axial direction, a large-diameter annular portion 38b on the second side of the cage 38 in the axial direction, and a plurality of cage bars 38c. The cage bars 38c connect the annular portions 38a and 38b together. Pockets 39 in which the tapered rollers 34 are housed correspond to spaces formed between the annular portions 38a and 38b and each between the adjacent cage bars 38c in a circumferential direction. Thus, the cage 38 can hold the tapered rollers 34 such that the tapered rollers 34 are spaced at intervals in the circumferential direction.

Figure 4:
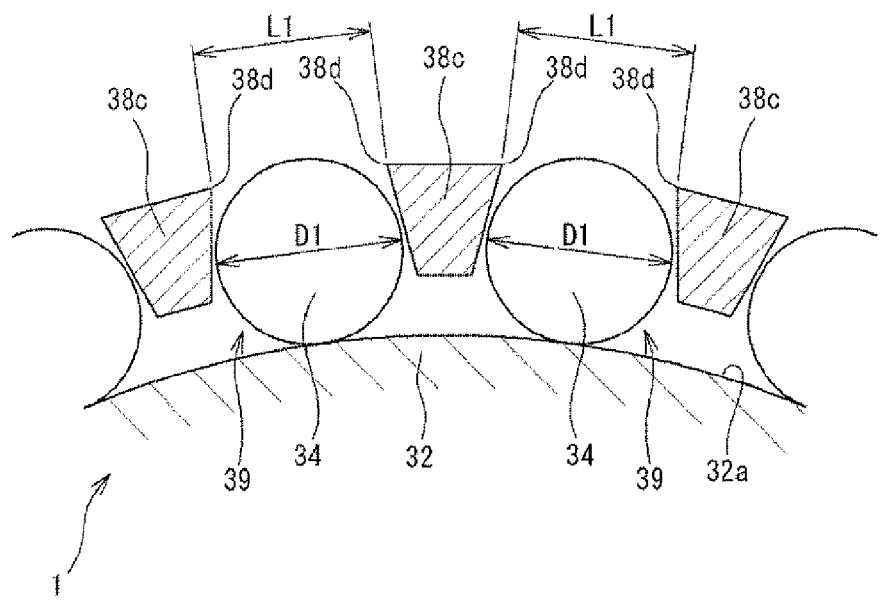
FIG. 4 is a sectional view of a bearing interior as seen in a direction parallel to roller centerlines.

The cage 38 has roller retaining portions that inhibit the tapered rollers 34 housed in the pockets 39 from falling outward in the radial direction (when the bearing is assembled). Each of the roller retaining portions in the present embodiment is an outer portion of the cage bar 38c (see FIG. 4). As depicted in FIG. 4, in a cross sectional view orthogonal to centerlines of the tapered rollers 34, a circumferential dimension L1 between a pair of roller retaining portions 38d and 38d positioned on the opposite sides of one pocket 39 in the circumferential direction is smaller than a diameter D1 of each of the tapered rollers 34 in the cross section (L1<D1). Thus, when being displaced outward in the radial direction, the tapered roller 34 in each of the pockets 39 comes into contact with the roller retaining portions 38d and 38d and is inhibited from falling outward in the radial direction.

Figure 3:
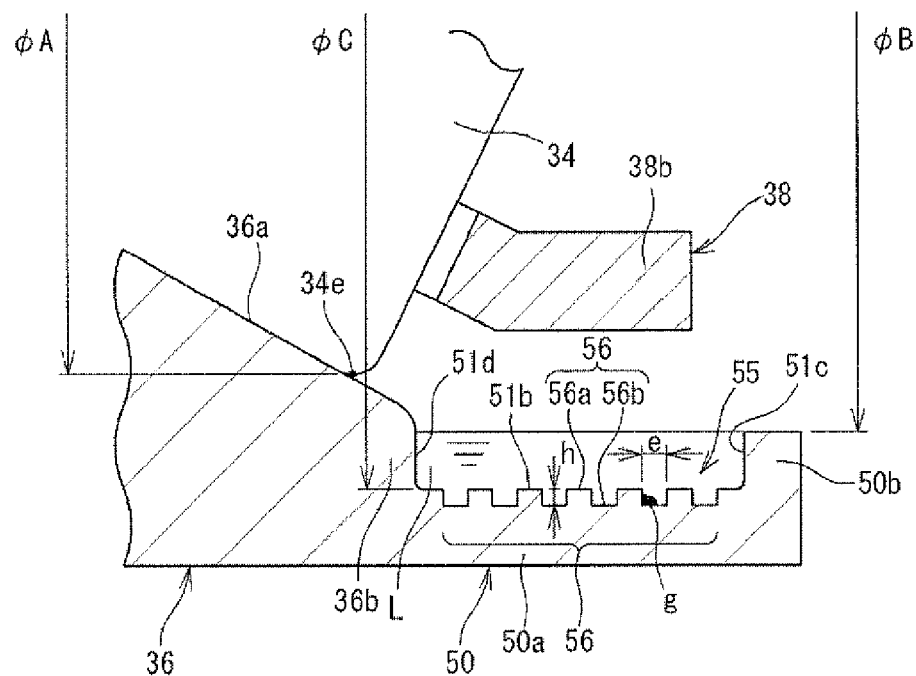
FIG. 3 is an enlarged view of a reservoir portion.

In FIG. 2, the reservoir portion 50 is a portion shaped like a short cylinder and provided on the second side of the outer ring 36 in the axial direction. A recessed groove 55 is formed on an inner periphery of the reservoir portion 50 to store the lubricant. FIG. 3 is an enlarged view of the reservoir portion 50. The reservoir portion 50 in the present embodiment has a cylindrical portion 50a and a ring portion 50b. The cylindrical portion 50a is formed to extend from a radially outer end 36b of the outer ring 36 further toward the second side in the axial direction. The ring portion 50b extends inward in the radial direction from a tip of the cylindrical portion 50a. The ring portion 50b serves as one sidewall defining the recessed groove 55. The end 36b of the outer ring 36 (a part of the end 36b) serves as the other sidewall defining the recessed groove 55.

The recessed groove 55 is a space defined by an inner peripheral surface 51b of the cylindrical portion 50a, an inner surface 51c of the ring portion 50b, and an outer side surface 51d of the end 36b of the outer ring 36. The recessed groove 55 is formed as an annular groove extending continuously in the circumferential direction. Thus, the recessed groove 55 receives lubricant L passing through the front bearing 30, particularly along the outer-ring raceway surface 36a. In a lower portion of the front bearing 30, the lubricant L can be held in an area outside a large-diameter annular portion 38b of the cage 38 in the radial direction. The reservoir portion 50 (recessed groove 55) is positioned outside the large rib 32c of the inner ring 32 in the radial direction as depicted in FIG. 2. In an upper portion of the front bearing 30, the ring portion 50b of the reservoir portion 50 allows the lubricant L stored in the reservoir portion 50 to be guided toward the large rib 32c of the inner ring 32.

In a longitudinal section, the recessed groove 55 of the reservoir portion 50 has recesses and protrusions at a bottom of the recessed groove 55 as depicted in FIG. 3. In other words, the inner peripheral surface 51b of the cylindrical portion 50a has a recessed and protruding portion 56 with the recesses and protrusions. In the present embodiment, a plurality of recessed portions 56b is formed and a plurality of protruding portions 56a is formed. However, the recessed and protruding portion 56 (recesses and protrusions) may have any configuration as long as the recessed and protruding portion 56 includes at least one protruding portions 56a. In the present embodiment, the recesses and protrusions have a pulse wave-like shape, with the protruding portions 56a being rectangular.

The reservoir portion 50 is configured such that a bore diameter φB of the sidewall defining the recessed groove 55, in other words, the bore diameter φB of the ring portion 50b, is larger than a diameter φA of a circle connecting respective radial outermost portions 34e of the tapered rollers 34 positioned on an outer periphery of the inner ring 32 (see FIG. 2) (φB>φA). In the present embodiment, the recessed groove 55 is further configured such that a bore diameter φC of each of the protruding portions 56a included in the recesses and protrusions (recessed and protruding portion 56) formed at the bottom of the recessed groove 55 is larger than the diameter φA.

The recessed portions 56b included in the recessed and protruding portion 56 are each set to be larger in size than foreign matter g that may be contained in the lubricant L. Examples of the foreign matter g include grinding chips resulting from shaping of the housing 12 (see FIG. 1) and the like and wear debris from the gear 14 and the pinion 16 (see FIG. 1). For the grinding chips, the size of the foreign matter g is, for example, 100 μm to 200 μm. For the wear debris, the size of the foreign matter g is, for example, 5 μm to 15 μm. Thus, an axial dimension e of each of the recessed portions 56b is equal to or larger than the maximum value (200 μm) for the foreign matter g and is set 1.5 times as large as the maximum value (300 μm) or smaller. Likewise, a depth dimension (radial dimension) h of the recessed portions 56b is set to a value equal to or larger than the axial dimension e.

A flow of the lubricant L in the differential apparatus 10 (see FIG. 1) configured as described above will be described. In FIG. 1, the lubricant L is stored in a lubricant chamber 19 that corresponds to a lower portion of the housing 12 and in which the ring gear 14 is arranged. The lubricant L in the lubricant chamber 19 is stirred, scooped up, and splattered by the rotating ring gear 14. In particular, the lubricant L scooped upward can flow through an introduction channel 21 formed in the upper portion of the housing 12 and between the front bearing 30 and the rear bearing 40. The lubricant L flowing in this manner can enter each of the front bearing 30 and the rear bearing 40 and is then used for lubrication.

The lubricant L having flowed through the front bearing 30 is held in the recessed groove 55 in the reservoir portion 50 formed continuously with the outer ring 36 and can stay in the front bearing 30 (the reservoir portion 50: see FIG. 2). In the differential apparatus 10, rotation is stopped and is thereafter resumed when a predetermined time has elapsed. Immediately after the resumption of rotation (at an initial stage of rotation), even the scooping up of the lubricant L in the lubricant chamber 19 as described above fails to immediately feed the lubricant L to the front bearing 30. However, in the present embodiment, the reservoir portion 50 allows the lubricant L staying in the front bearing 30 to be used in the initial stage of rotation. In particular, in the tapered roller bearing (see FIG. 2), the tapered rollers 34 come into sliding contact with the large rib 32c of the inner ring 32. However, the reservoir portion 50 allows the lubricant L staying in the front bearing 30 to be used to lubricate the sliding contact surfaces (sliding surfaces) of the tapered rollers 34 and the large rib 32c. As a result, in the initial stage of rotation, the contact surfaces of the tapered rollers 34 and the large rib 32c can be prevented from being in a poor lubrication state.

The recessed groove 55 in the reservoir portion 50 has the recesses and protrusions at the bottom (inner peripheral surface 51b) of the recessed groove 55, as described above (see FIG. 3). Thus, the lubricant L can flow out from the recessed groove 55. However, the foreign matter g having entered the recessed portion 56b is caught on the protruding portion 56a and prevented from flowing out from the recessed groove 55. The foreign matter g can be hindered from entering the bearing interior, for example, from reaching the raceway surfaces 32a and 36a or between the large rib 32c and the tapered rollers 34. If the foreign matter g enters the bearing interior along with the lubricant L, this may shorten the life of the bearing. However, with the front bearing 30 in the present embodiment, it is possible to prevent the life of the bearing from being shortened due to the foreign matter g.

Figure 5:
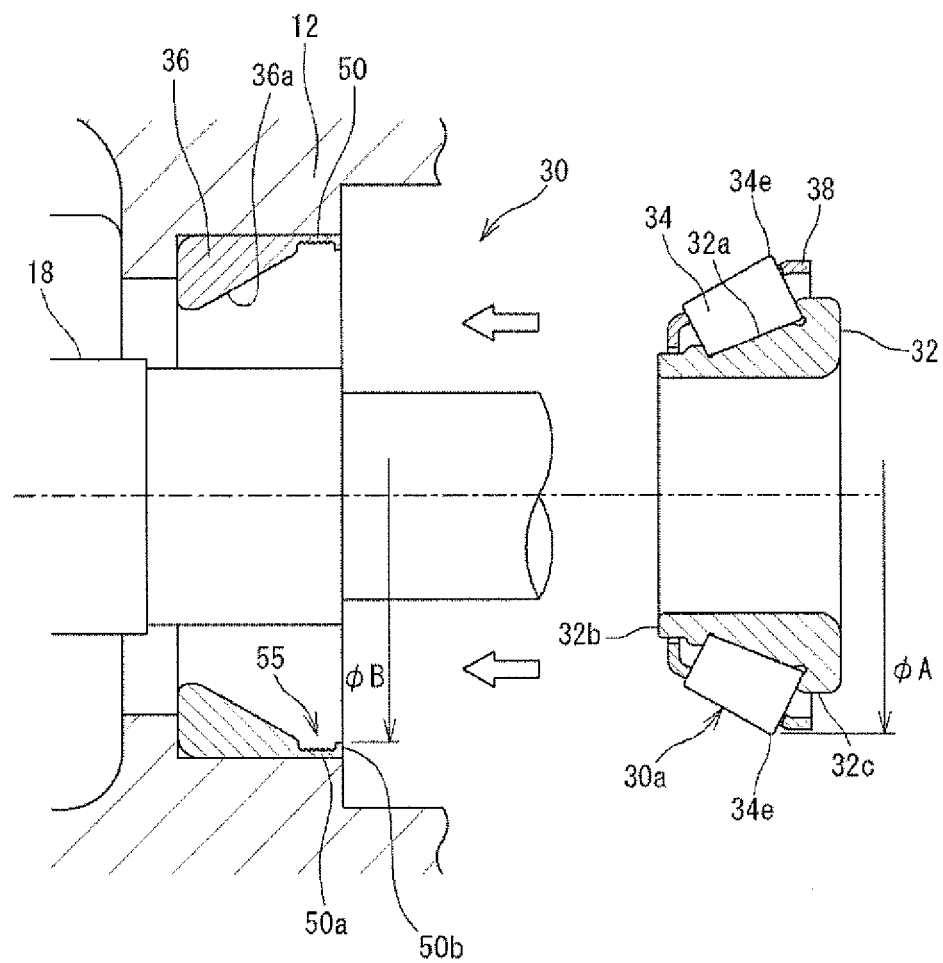
FIG. 5 is a diagram illustrating assembly of a front bearing depicted in FIG. 2.

FIG. 5 is a diagram illustrating assembly of the front bearing 30 depicted in FIG. 2. To construct the front bearing 30 depicted in FIG. 2, first, the outer ring 36 integrated with the reservoir portion 50 is pressed in the axial direction and press-fitted into the housing 12. FIG. 5 illustrates that the outer ring 36 has been completely press-fitted into the housing 12.

Then, the cage 38 with the tapered rollers 34 housed therein is positioned on the inner-ring raceway surface 32a of the inner ring 32 to form an inner ring unit 30a. The inner ring unit 30a is moved along the axial direction and closer to the outer ring 36 with the reservoir portion 50 while being externally fitted over a shaft end of the shaft 18. Thus, the tapered rollers 34 included in the inner ring unit 30a pass through the reservoir portion 50. The inner ring unit 30a is moved along the axial direction to a position where the tapered rollers 34 come into contact with the outer-ring raceway surface 36a.

At this time, the radial outermost portions 34e of the tapered rollers 34 do not interfere with the ring portion 50b of the reservoir portion 50 over the entire circumference of the ring portion 50b. This is because the bore diameter φB of the ring portion 50b of the reservoir portion 50, that is, the bore diameter φB of the sidewall defining the recessed groove 55, is larger than the diameter φA of the circle connecting the radial outermost portions 34e of the tapered rollers 34 positioned on the outer periphery of the inner ring 32 (φB>φA), as described above. Moreover, in the present embodiment, the radial outermost portions 34e of the tapered rollers 34 do not interfere with the recessed and protruding portion 56 of the reservoir portion 50 (see FIG. 3). This is because the bore diameter φC of each of the protruding portions 56a included in the recessed and protruding portion 56 is larger than the diameter φA (φC>φA). As described above, the inner ring unit 30a is assembled to the outer ring 36 with the reservoir portion 50 to form the front bearing 30 (see FIG. 2).

The tapered roller bearing (front bearing 30) in the present embodiment includes the outer ring 36, the inner ring 32, the tapered rollers 34, the annular cage 38, and the reservoir portion 50, as depicted in FIG. 2. In the reservoir portion 50, the recessed groove 55 is formed on the second side of the outer ring 36 in the axial direction to store the lubricant L on an inner periphery of the outer ring 36. The outer ring 36 and the reservoir portion 50 are integrated together. As depicted in FIG. 3 and FIG. 5, the bore diameter φB of the sidewall (ring portion 50b) defining the recessed groove 55 of the reservoir portion 50 is larger than the diameter φ A of the circle connecting the radial outermost portions 34e of the tapered rollers 34 positioned on the outer periphery of the inner ring 32.

In this configuration, the lubricant L can be stored in the recessed groove 55 in the reservoir portion 50 provided on the second side of the outer ring 36 in the axial direction. The lubricant L can be used to lubricate the tapered roller bearing (front bearing 30). In particular, the inner ring 32 has the large rib 32c, which comes into contact with the tapered rollers 34, on the second side of the inner ring 32 in the axial direction where the reservoir portion 50 is provided. Consequently, the lubricant L in the reservoir portion 50 can be used to lubricate areas between the large rib 32c and the tapered rollers 34. Thus, in the initial stage of rotation of the front bearing 30, the contact surfaces of the tapered rollers 34 and the large rib 32c can be prevented from being in the poor lubrication state.

As depicted in FIG. 5, the outer ring 36 and the reservoir portion 50 are integrated together. Consequently, the outer ring 36 and the reservoir portion 50 can be integrally handled when installed in the housing 12. As a result, a configuration can be easily obtained which allows the lubricant L to be stored in the front bearing 30. Moreover, when the tapered roller bearing is assembled by moving the inner ring unit 30a closer to the outer ring 36 integrated with the reservoir portion 50, the sidewall (ring portion 50b) defining the recessed groove 55 does not interfere with the radial outermost portions 34e of the tapered rollers 34 in the inner ring unit 30a, facilitating the assembly.

Figure 6:
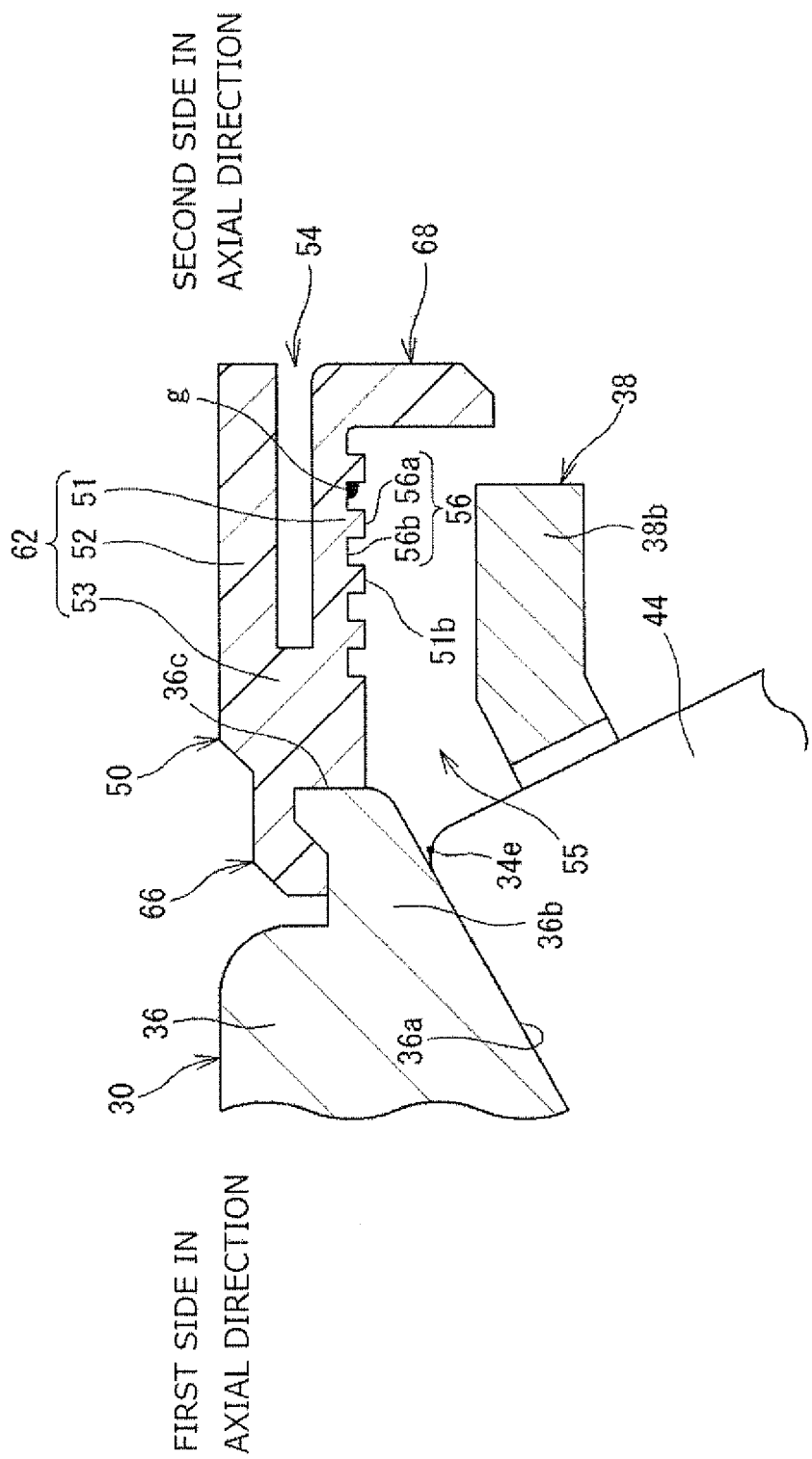
FIG. 6 is a longitudinal sectional view depicting a part of a tapered roller bearing in another form.

FIG. 6 is a longitudinal sectional view depicting a part of another form of the tapered roller bearing (front bearing 30). In the front bearing 30 depicted in FIG. 6, the outer ring 36 is separate from the reservoir portion 50. In other words, the reservoir portion 50 is a holding member dedicated to storage of the lubricant. The reservoir portion 50 is a cylindrical member formed separately from the outer ring 36. The reservoir portion 50 has a cylindrical portion 62 and an annular protruding portion 68. The cylindrical portion 62 is provided adjacently to the outer ring 36. The protruding portion 68 protrudes inward in the radial direction from the cylindrical portion 62. The cylindrical portion 62 is provided in contact with a large-diameter end face 36c of the outer ring 36. An annular groove (recessed groove 55) with a recessed section is defined by the cylindrical portion 62, the annular protruding portion 68, and the end 36b of the outer ring 36 on the second side in the axial direction. The reservoir portion 50 has a fitting portion that is fitted over a part of the outer ring 36 so that the reservoir portion 50 is integrated with the outer ring 36. The fitting portion in the present embodiment is a fitting pawl 66. The reservoir portion 50 is made of resin.

In the cylindrical portion 62 of the reservoir portion 50, a slit 54 is formed which is open toward the second side in the axial direction. The slit 54 separates the cylindrical portion 62 into a radially inner portion 51 provided with the protruding portion 68 and a radially outer portion 52 in the radial direction. The cylindrical portion 62 has a base portion 53 that connects the radially inner portion 51 and the radially outer portion 52 together. In the present embodiment, the slit 54 is formed over the entire circumference of the cylindrical portion 62. The slit 54 is formed to allow the radially inner portion 51 provided with the protruding portion 68 to be easily elastically deformed outward in the radial direction. During assembly of the front bearing 30, the inner ring unit for the front bearing 30 depicted in FIG. 6 is moved closer to the outer ring 36 and the reservoir portion 50 along the axial direction (as is the case with FIG. 5). In this case, even when the protruding portion 68 comes into contact with the large-diameter annular portion 38b of the cage 38 or the radial outermost portions 34e of tapered rollers 44, the protruding portion 68 itself is elastically deformed. The radially inner portion 51 provided with the protruding portion 68 can also be elastically deformed outward in the radial direction. This enables the large-diameter annular portion 38b of the cage 38 included in the inner ring unit and the radial outermost portions 34e of the tapered rollers 44 also included in the inner ring unit to pass through the reservoir portion 50.

The recessed groove 55 in the reservoir portion 50 in this form has the recesses and protrusions at the bottom of the recessed groove 55. The reservoir portion 50 in this form is the same, in this respect, as the reservoir portion 50 depicted in FIG. 3. The reservoir portion 50 in this form allows the lubricant to be stored in the recessed groove 55 in the reservoir portion 50 formed on the second side of the outer ring 36 in the axial direction. The lubricant can be used to lubricate the tapered roller bearing (front bearing 30). Thus, for example, in the initial stage of rotation, the bearing interior can be prevented from being in the poor lubrication state. Since the recessed groove 55 in the reservoir portion 50 has the recesses and protrusions at the bottom of the recessed groove 55, the foreign matter g building up at the bottom is hindered from flowing out, making entry of the foreign matter into the bearing interior difficult.

The disclosed embodiments are illustrative in every respect and are not restrictive. In other words, the tapered roller bearing according to the invention is not limited to the illustrated forms but may be in any other form within the scope of the invention. In the above-described embodiments, the recesses and protrusions formed at the bottom of the recessed groove 55 have a pulse wave-like shape. However, the shape can be changed and may be like a triangular wave or the like. In the above-described embodiments, the rotating apparatus including the tapered roller bearing according to the invention has been described as the differential apparatus but may be a gear mechanism such as a transmission in an automobile.

The tapered roller bearing according to the invention allows the lubricant to be stored in the recessed groove in the reservoir portion. Even when the lubricant contains foreign matter, the recesses and protrusions hinder the foreign matter building up at the bottom of the recessed groove from flowing out. This makes entry of the foreign matter into the bearing interior difficult, preventing the life of the bearing from being shortened due to the foreign matter.

What is claimed is:

1. A tapered roller bearing comprising:
   an outer ring having an outer-ring raceway surface that increases in diameter from a first side toward a second side in an axial direction;
   an inner ring having an inner-ring raceway surface facing the outer-ring raceway surface and having a cone back face rib that is located on the second side of the inner ring in the axial direction and that protrudes outward in a radial direction;
   a plurality of tapered rollers interposed between the outer-ring raceway surface and the inner-ring raceway surface and contacting the cone back face rib;
   an annular cage that holds the tapered rollers spaced at intervals in a circumferential direction; and
   a reservoir portion that is provided on the second side of the outer ring in the axial direction and having a recessed groove that is formed on an inner periphery of the reservoir portion and in which lubricant is stored, wherein
   the recessed groove has a recess and protrusion at its bottom.

2. The tapered roller bearing according to claim 1, wherein
   the outer ring and the reservoir portion are integrated together, and
   a bore diameter of a sidewall defining the recessed groove of the reservoir portion is larger than a diameter of a circle connecting respective radial outermost portions of the tapered rollers positioned on an outer periphery of the inner ring.

3. The tapered roller bearing according to claim 2, wherein
   a bore diameter of a protruding portion included in the recess and protrusion is larger than the diameter of the circle connecting the radial outermost portions of the tapered rollers positioned on the outer periphery of the inner ring.

* * * * *